UNITED STATES PATENT OFFICE.

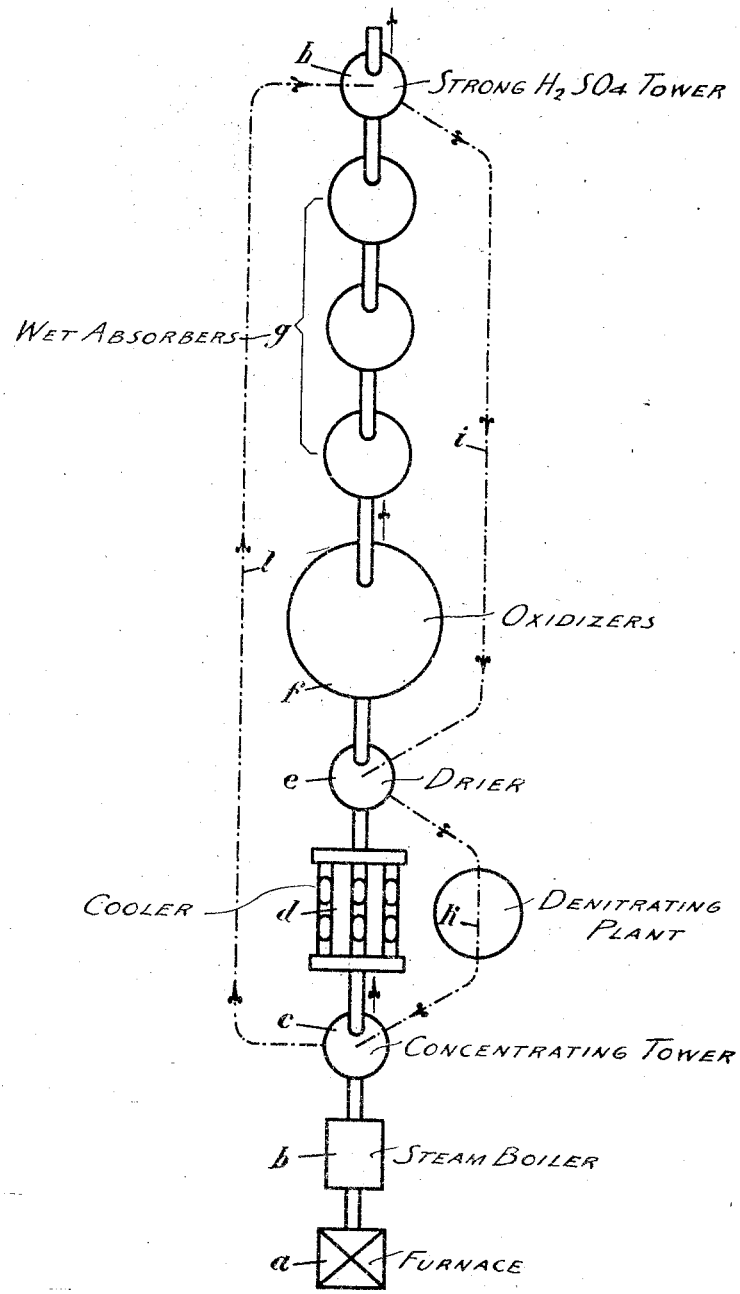

HARRY PAULING, OF GELSENKIRCHEN, GERMANY, ASSIGNOR TO THE FIRM OF SALPETERSÄURE-INDUSTRIE-GESELLSCHAFT, G. M. B. H., OF GELSENKIRCHEN, GERMANY.

PROCESS OF ABSORBING NITROUS GASES.

1,037,977. Specification of Letters Patent. Patented Sept. 10, 1912.

Application filed June 8, 1911. Serial No. 632,076.

*To all whom it may concern:*

Be it known that I, HARRY PAULING, a subject of the King of Prussia, residing at Gelsenkirchen, in the Kingdom of Prussia and German Empire, have invented a new and useful Improved Process for Absorbing Nitrous Gases, of which the following is a specification.

This invention relates to the manufacture of nitric acid; and it comprises a process wherein nitrous gases, that is, gases containing nitrogen oxids, such as the gases resulting from the treatment of air or other gaseous mixture containing nitrogen and oxygen by means of the electric arc, are first treated at relatively high temperatures with dilute sulfuric acid, are next deprived of a portion of the moisture taken up from the dilute sulfuric acid, are further dried by means of concentrated sulfuric acid, are next treated by a wet absorbing process, as by treatment with water, whereby nitrogen oxids are largely removed from said gases with the formation of nitric acid, and are finally treated with concentrated sulfuric acid whereby the remaining and difficultly absorbable nitrogen oxids are substantially completely removed from said gases, the nitrated sulfuric acid from this final step being employed to dry the gases at an earlier stage of the process thereby undergoing dilution and denitration, the dilute sulfuric acid thus obtained being employed in the first treating step and thereby being reconcentrated, and the sulfuric acid thus reconcentrated being passed repeatedly through the cycle of steps just described; all as more fully hereinafter set forth and as claimed.

Heretofore it has not been possible to quantitatively absorb—that is absorb without any loss—the nitrogen oxids in mixtures of gases resulting from the combustion of air, because in the usual wet absorbing processes, as for example where the gases containing oxids are treated with water, a part of the $NO_2$ produced in the combustion of the air is again decomposed in the absorption process into NO and is consequently not absorbed. Nitrogen peroxid, ($NO_2$) reacts with warm water to yield nitric acid ($HNO_3$) and nitric oxid (NO); and since nitric oxid is only slightly soluble in water, very little of it is retained in solution. On the other hand, as in the production of nitrate of lime for example, a quantitative absorption by an alkaline treating solution results in the formation of an excess of nitrite which cannot be utilized for many purposes.

The present applicant has now discovered that the nitrous gases can be so quantitatively absorbed as to form nitric acid if the unabsorbed nitrous gases, hereinafter referred to as the residual gases, which leave the wet absorbing apparatus proper, after being suitably oxidized, are taken up by sulfuric acid. These residual nitrous gases are usually accompanied of course by varying quantities of free nitrogen, oxygen, and the like.

In order to avoid a separate denitration of the sulfuric acid after it has absorbed the residual gases, the following method is adopted. The gases leaving the reaction furnace at a very high temperature and containing nitrogen oxids resulting from the heat treatment of air or other gaseous mixture of nitrogen and oxygen, after their sensible heat has been utilized for raising steam or for other purposes, are conducted at a temperature of about 400° C. or more into an acid proof tower to which dilute sulfuric acid is supplied for concentration. In this tower, the hot gases abstract water from the dilute sulfuric acid. The concentrated sulfuric acid leaving this tower is used for absorbing the residual gases before mentioned. The gases which leave the sulfuric acid concentrating tower are of course strongly charged with moisture, and they are accordingly cooled down to the usual temperature by suitable apparatus, the greater part of the water taken up from the sulfuric acid being thus separated, together with more or less nitric acid. Nevertheless these gases after cooling still contain so much moisture that, as a consequence, the concentration of the nitric acid produced in the following absorbing process would be much reduced if further measures were not taken for removing moisture. In order to overcome this difficulty the gases are caused to come into contact with a countercurrent of sulfuric acid in a drying tower or other similar apparatus. The sulfuric acid employed here comes from an apparatus in which the residual gases are absorbed and therefore contains compounds of nitrogen oxids with sulfuric acid such as nitrosyl sulfuric acid and the like. The moist nitrous gases are thus dried while, at the same time, the nitrated sulfuric acid is diluted and heated by taking up water vapor, the total latent heat of the water vapor being liberated. By this dilution and heating the sulfuric acid is denitrated to such an extent that only a small denitrating plant is necessary, in order to expel, if desired, such traces of nitrous gases as may still be present in the acid.

The dilute and largely denitrated sulfuric acid flowing out of the drying apparatus is delivered to the concentration tower again and repeats the circulation just described. Prior to its delivery to the concentration tower, the dilute sulfuric acid may be completely denitrated by special means where such denitration is desirable. This method of working has the further considerable advantage that the mixed gases leaving the drying tower on coming into contact with the relatively dilute nitric acid of the first absorption tower, while giving up a large proportion of their content of nitrogen oxids to the absorbing liquid, become partly saturated with moisture, and therefore tend to concentrate the nitric acid of the first tower. Furthermore, the gases are well cooled down by this absorption and this leads to a higher concentration in the first tower and also to considerably better absorption, because, according to the experience of the applicant, the wet absorption takes place more quickly and in smaller apparatus in proportion to the extent to which the nitrous gases and the absorbing liquid are cooled.

In the accompanying drawing I have shown, diagrammatically, a plan of apparatus suitable for use in the present process.

The nitrous gases produced in the apparatus $a$, an electric furnace for example, deliver the greater part of their heat to the boiler $b$ and enter at a temperature of 400° C. or more into the acid proof tower $c$. Here the gases absorb moisture from dilute sulfuric acid moving in countercurrent, so that they become strongly charged with moisture. It is therefore necessary to remove this moisture from the gases which is done partly in the condensing or cooling plant $d$ connected with the tower $c$. The gases are then further dried in the drying tower $e$. In this tower the gases are brought into intimate contact with concentrated sulfuric acid moving in countercurrent so that they are dried, whereupon they are first oxidized in the tower $f$ as by treatment with air or otherwise, and are then subjected in the towers $g$ to a wet absorption. The remaining nitrogen oxids in the gases issuing from the towers $g$ are entirely absorbed by highly concentrated sulfuric acid in the tower $h$.

The sulfuric acid circulates as follows: The sulfuric acid leaving the lower end of the tower $h$ in which the remaining oxids are absorbed by highly concentrated sulfuric acid contains compounds of nitrogen oxids with sulfuric acid, such as nitrosyl sulfuric acid, and is conducted by the pipe $i$ to the drying tower $e$, where it takes up the moisture contained in the gases moving in countercurrent thereto and is consequently diluted and more or less completely denitrated. From thence the dilute sulfuric acid may pass through a small denitration plant $k$ to the concentrating tower $c$, in which it is concentrated and then conducted back by the pipe $l$ to the tower $h$, where the circulation begins again.

The process as carried out practically amounts therefore to treating the current of gases containing nitrogen oxids in a plurality of more or less separated stages with counterflowing sulfuric acid, the character and concentration of the sulfuric acid at each such stage being adapted to the requirements of the gaseous stream at that stage. At an initial stage, the nitrous gases coming from an electric furnace, for example, and at a relatively high temperature, meet and progress against a stream of dilute sulfuric acid from which they abstract a large amount of moisture, being cooled somewhat in the operation. At an intermediate stage, after removal of some of the moisture taken up in the initial stage, the gases are dried by an oppositely flowing current of strong sulfuric acid, any nitro products which may be present in the sulfuric acid being largely eliminated at this stage and passing on with the current of gases. The current of gases then passes through a train of absorption apparatus where the bulk of the nitrogen oxids is absorbed in water, for example, forming a solution of nitric acid. Any oxids of low solubility, such as nitric oxid resulting both from possibly insufficient previous oxidation as well as that evolved from the absorption reaction accompanying the solution of the more soluble oxids, of course escape absorption and pass on with the gaseous current. These unabsorbed oxids or residual gases are recovered in a final stage by treatment with highly concentrated sulfuric acid flowing in countercurrent, nitric oxid dissolving in or combining with such sulfuric acid to form what may be termed a nitrated sulfuric acid, probably containing compounds of the nitrosyl sulfuric type. As before explained, the sulfuric acid may be circulated in a closed circuit, contacting with the counterflowing current of gases at the various stages as required, and undergoing cyclically the variations in character and concentration before indicated.

What I claim is:—

1. The process of absorbing oxids of nitrogen, which comprises subjecting gases containing said oxids to a wet absorbing process, absorbing the oxids remaining in the gases by contact with sulfuric acid, and using the nitrated sulfuric acid thus obtained for drying gases containing oxids of nitrogen previous to their subjection to the absorbing process.

2. The process of absorbing nitrous gases, which consists in bringing said gases at a temperature of about 400° C. into contact with dilute sulfuric acid, condensing a part of the moisture taken up by the gases from said dilute sulfuric acid, bringing the gases thus partially dried into contact with concentrated sulfuric acid to dry the same, oxidizing said dried gases, subjecting said oxidized gases to a wet absorbing process, and absorbing the oxids remaining in the gases by concentrated sulfuric acid.

3. In the manufacture of nitric acid, the process which comprises passing a current of gases containing nitrogen oxids through suitable apparatus, treating said current at an initial stage with dilute sulfuric acid, treating said current at an intermediate stage with concentrated sulfuric acid containing nitrosyl sulfuric acid, and treating said current at a final stage with concentrated and substantially pure sulfuric acid.

In testimony whereof I have signed my name to this specification in the presence of two subscribing witnesses.

HARRY PAULING.

Witnesses:
RICHARD MERKEL,
M. KNEPPERS.